No. 779,719. PATENTED JAN. 10, 1905.
P. KRUSE.
CAN TESTING MACHINE.
APPLICATION FILED APR. 18, 1904.

3 SHEETS—SHEET 1.

WITNESSES:
W. Haberland
J. H. Smuse

INVENTOR:
Peter Kruse
By Geo. H. Strong
Atty.

No. 779,719. PATENTED JAN. 10, 1905.
P. KRUSE.
CAN TESTING MACHINE.
APPLICATION FILED APR. 18, 1904.

3 SHEETS—SHEET 2.

WITNESSES: INVENTOR:
W. Haberland. Peter Kruse
By Geo. H. Strong.
Atty

No. 779,719. PATENTED JAN. 10, 1905.
P. KRUSE.
CAN TESTING MACHINE.
APPLICATION FILED APR. 18, 1904.
3 SHEETS—SHEET 3.
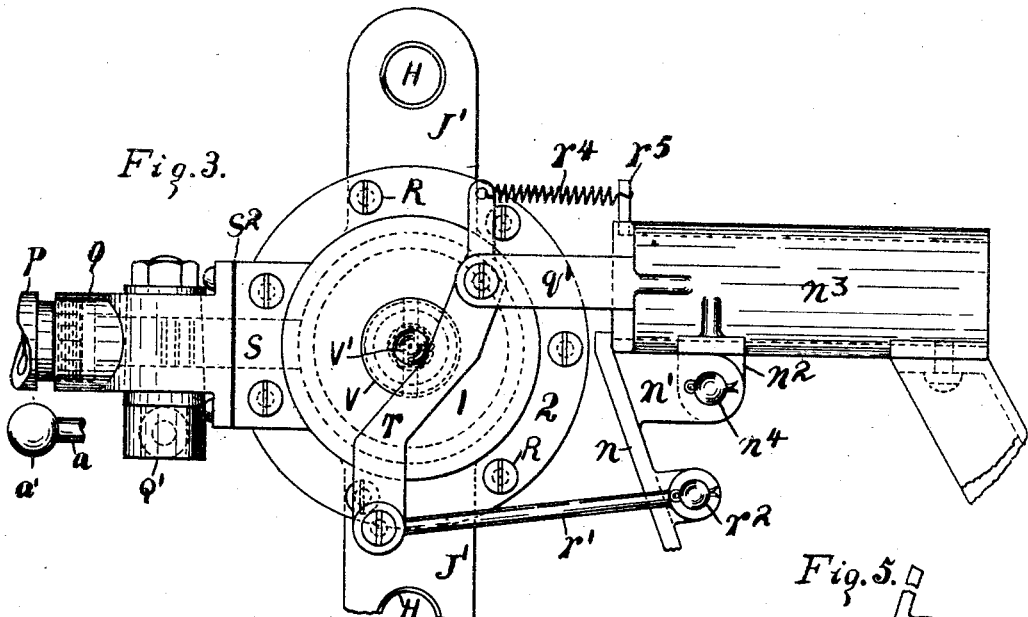
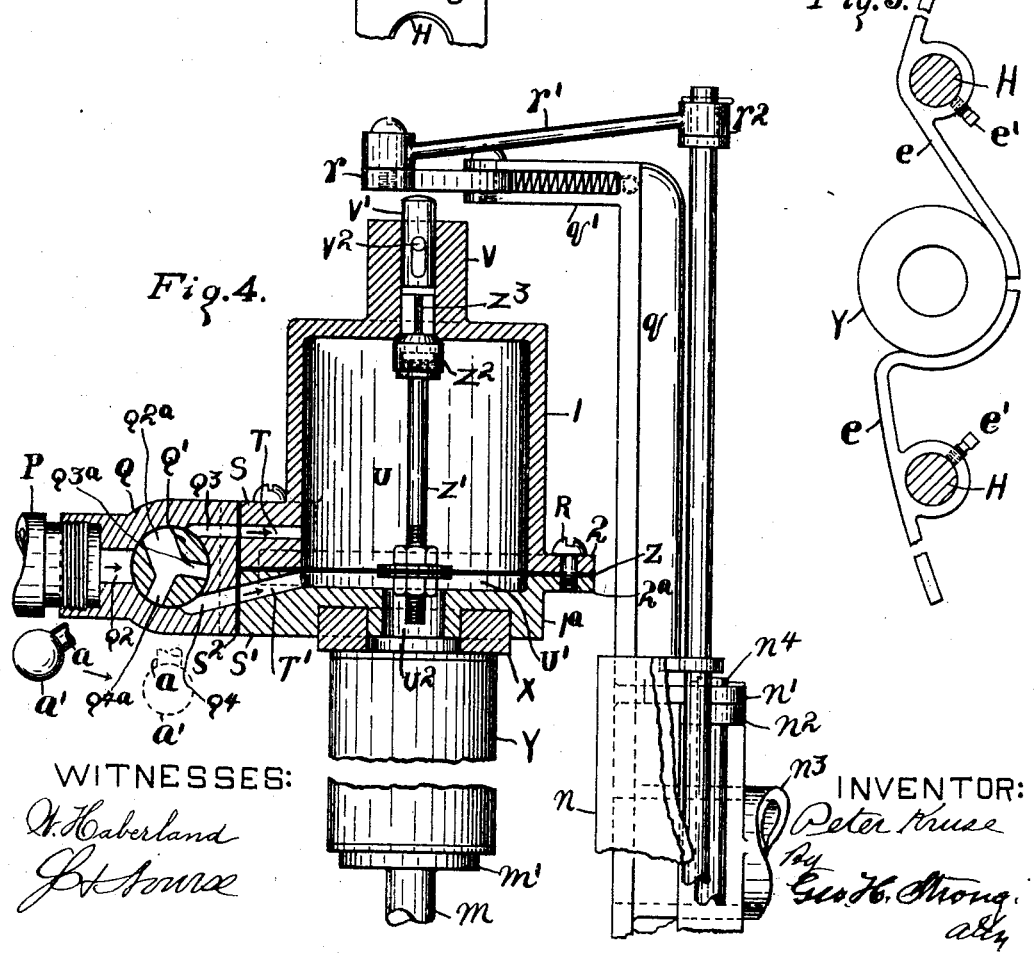
WITNESSES:
W. Haberland
INVENTOR:
Peter Kruse
by Geo. H. Strong
Atty No. 779,719.

Patented January 10, 1905.

UNITED STATES PATENT OFFICE.

PETER KRUSE, OF ASTORIA, OREGON, ASSIGNOR OF ONE-THIRD TO THE ASTORIA IRON WORKS, OF ASTORIA, OREGON, A CORPORATION OF OREGON.

CAN-TESTING MACHINE.

SPECIFICATION forming part of Letters Patent No. 779,719, dated January 10, 1905.

Application filed April 18, 1904. Serial No. 203,648.

*To all whom it may concern:*

Be it known that I, PETER KRUSE, a citizen of the United States, residing at Astoria, in the county of Clatsop and State of Oregon, have invented new and useful Improvements in Can-Testing Machines, of which the following is a specification.

My invention has for its object the production of a machine for testing sheet-metal cans; and it consists in devices for automatically receiving the cans and mechanism for holding or clamping the can against a pressure-chamber.

Another object of the invention is to provide improved means for automatically finding and discharging leaky cans through a false bottom in the runway provided for delivering tight cans, thereby dispensing with an operator.

A further object of my invention is to provide improved means for testing cans without wetting them, thereby dispensing with a drying-machine.

With these ends in view my invention consists in the novel devices and novel combinations of parts and devices herein shown and described, and more particularly pointed out in the claims.

Figure 1:
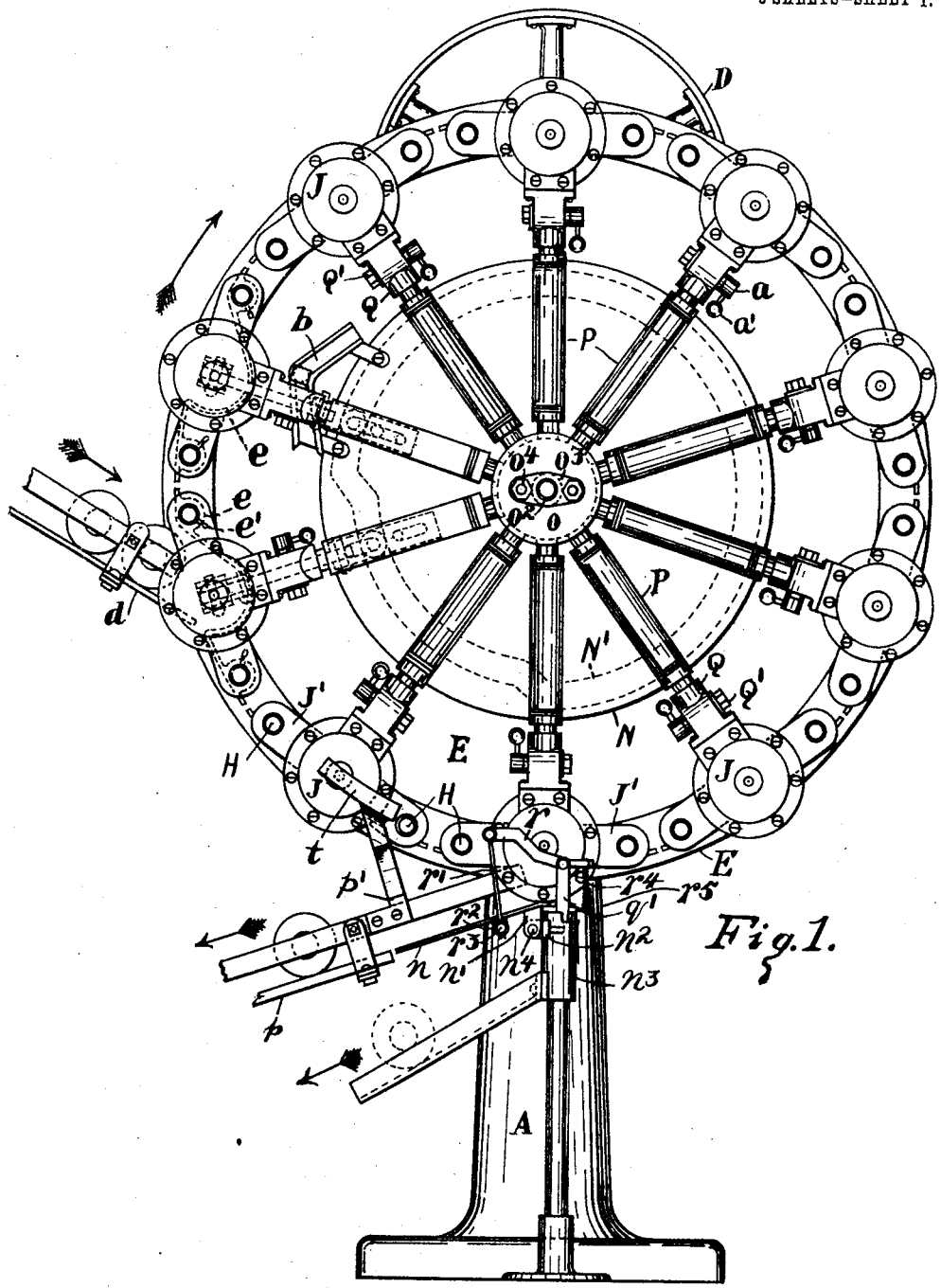
Figure 2:
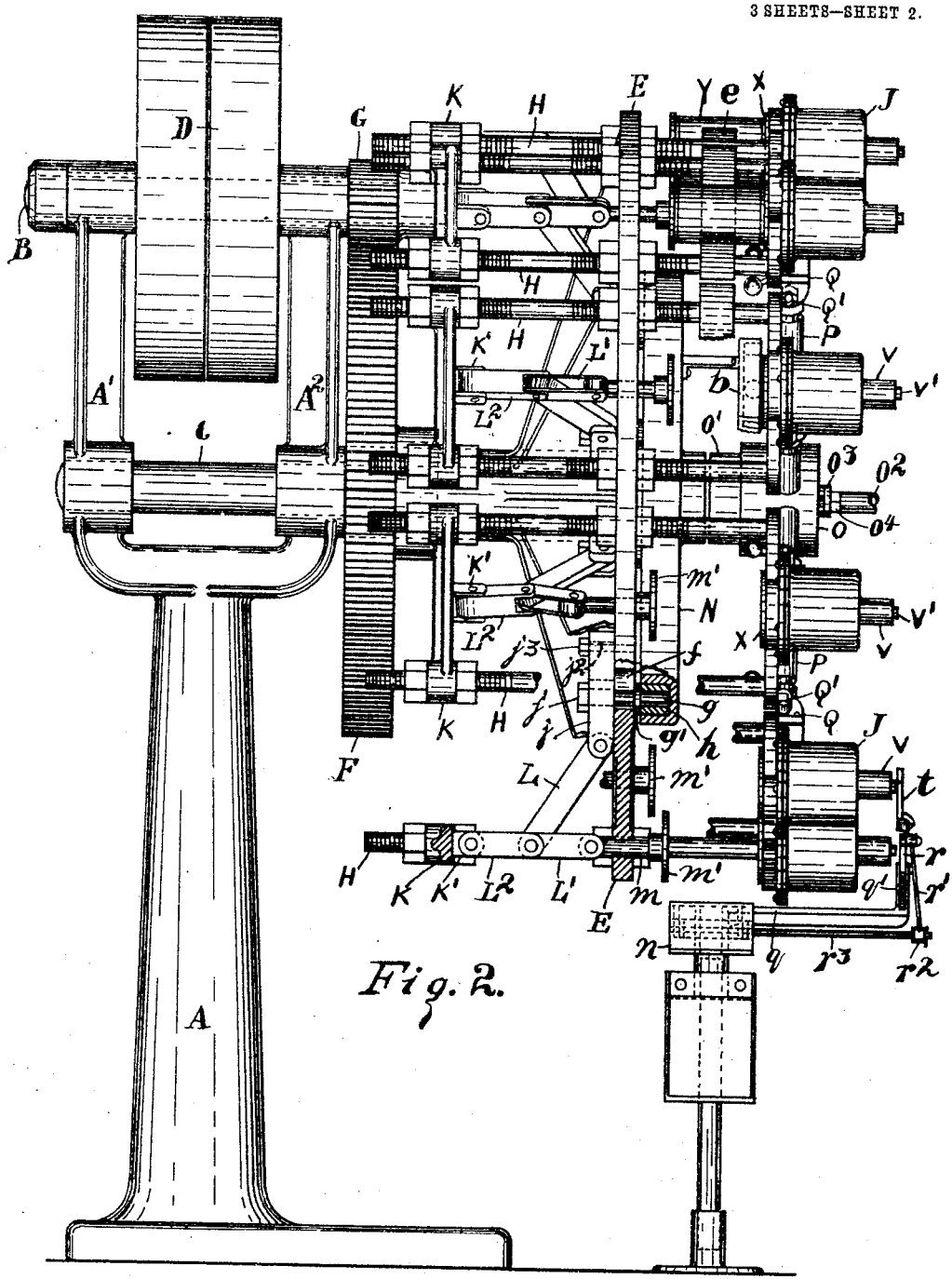

In the accompanying drawings, which form a part of this specification, Figure 1 represents a front elevation of my machine. Fig. 2 is a side elevation of same. Fig. 3 is a part view of a pressure-chamber. Fig. 4 is a sectional view of Fig. 3. Fig. 5 is a detail of the adjustable can-pocket.

In carrying out the invention, A is a column with a suitable base and represents the main frame of the machine.

A' and A² are standards arising from the column and carry the bearings for the main shaft B and a stationary shaft C.

On the main shaft B are the driving-pulleys D. On the stationary shaft C is a large disk E, on the hub of which is secured the gear-wheel F, which meshes with a pinion G, secured to the main shaft B. It will be seen that when the main shaft B, with the pinion G, rotates it revolves the gear F and the disk E on the stationary shaft C.

Secured by the studs H to the disk E at intervals apart are the pressure-chambers J. Each chamber has two studs, which are screwed into wings or arms J', as shown in Fig. 3. The studs H, as will be seen in Fig. 2, extend from the pressure-chambers through the disk E, where they are each firmly held by two nuts and have on their outer end some distance from the disk a cross bar or brace K, which is also firmly held in place by nuts on the stud H. The brace K has projections K', to which is pivoted the mechanism for clamping the can against the pressure-chamber J. This operation will be described later.

It will be readily seen that when the disk E revolves the pressure-chambers J, being secured to it by the studs H, will also revolve. On the stationary shaft C and in a position close to the disk E is a cam N, provided with a cam-track N'. On the extreme end of the stationary shaft C is an air-chamber O. Said chamber is provided with an extension O', which is bored out to fit the shaft C, permitting the chamber to revolve freely on the end of the shaft. Air is introduced into this chamber O through a pipe O². The pipe being stationary, there is provided a gland O³, which encircles the pipe and makes an airtight connection with the chamber, said gland being secured to the chamber by studs O⁴.

The object of the chamber O is to provide air for the pressure-chambers J through a rubber hose P and inlet-valve chamber Q and valve-plug Q'.

I will now describe the construction and operation of the pressure-chambers J. (Shown more particularly in Figs. 3 and 4.)

The pressure-chamber consists of two separate parts, which for convenience I will term "part 1" and "part 1ª." Part 1 is the longer of the two and consists of a cylindrical-shaped casting of any suitable material, which in this case is preferably cast-iron. As will be seen, it is provided with a flange 2 for the purpose of securing it to the part 1ª, which has a similar flange 2ª, by the screws R. On the flanges 2 and 2ª and forming part thereof are cast the projections S on part 1 and S' on part 1ª, through which are cored or cut the air-ports T, part 1, and T', part 1ª. These air-ports T and T' lead into the air-cavities U in part 1 and U' in part 1ª. On the bottom or closed end of part 1 is cast a circular projection V, through which a hole is bored leading into the air-cavity U. In this hole in the projection V is a slotted pin V', which is retained in the hole by a small pin V², riveted in the projection V. The pin V' is loosely fitted in the hole, and the slot limits its movement. In the face or top of part 1ª is secured a rubber disk or ring X, the object of which is to provide an air-tight connection between it and the can Y, as shown. The air-cavity U' is open to the atmosphere through the hole U² when there is no can in position, as shown. When the parts 1 and 1ª are bolted together, they have secured between their flanges 2 and 2ª a diaphragm Z, which makes an air-tight connection between the cavities U and U'. To the diaphragm Z is secured a stem Z', which supports a valve Z² on its end. The valve Z² is provided with wings Z³, which act to steady it in the hole bored in the projection V. The edge of the hole being faced off sufficiently forms a valve-seat for the valve Z². The object of the valve Z² is to make an air-tight closure between the cavity U and the end of the pin V'. When parts 1 and 1ª are secured together, with the diaphragm Z between the flanges 2 and 2ª, the projections S and S' afford a flat surface, to which is secured by screws the valve-chamber Q, with the valve-plug Q'. Between the surfaces S and S' and the valve-chamber Q is a gasket S², of any suitable material for forming an air-tight connection. The chamber Q is provided with the air-ports Q², Q³, and Q⁴. The plug Q' has corresponding ports Q²ª, Q³ª, and Q⁴ª. To the valve-plug Q' is secured a lever $a$, provided on its end with the ball $a'$. The object of the lever and ball is to provide means for turning the valve-plug Q' by engaging with a cam-track $b$, secured to the circular cam-disk N. When the lever $a$ with the ball $a'$ is in a position indicated by the dotted outlines, Figs. 3 and 4, the valve-plug Q' is in a position so that the air-ports Q²Q²ª, Q³Q³ª, and Q⁴Q⁴ª of the plug and valve-chamber correspond, thereby permitting the air to have free access to the cavities U and U' through the air-ports T and T' of the parts 1 and 1ª. With a can Y in position as shown in Fig. 4 and the lever $a$ in position indicated by the dotted outlines the air would fill the cavity U' and the interior of the can Y, also the cavity U, causing an equal pressure to bear on each side of the diaphragm Z. By turning the valve-plug Q' by the lever $a$ to the position shown in full lines, Fig. 4, communication between all the air-ports would be shut off. Now should the can Y leak it would allow a certain amount of air to escape from the interior of the can Y and the cavity U', thereby diminishing the pressure on one side of the diaphragm Z. The cavity U having still the original air-pressure, said air would expand and cause the diaphragm Z, with the stem Z', to rise, causing the valve Z² to unseat and allow the air to escape between the valve-wings Z³ against the end of the pin V', thus causing it to move outward the length of the slot. The pin V' being loosely fitted in the hole allows the pressure to exhaust slowly to the atmosphere after the pin V' has been forced out. It might be stated that the air-ports Q⁴ª in the valve-plug Q⁴ in the valve-chamber and T' in the part 1 are of greater dimension than the corresponding ports Q³, Q³ª, and T. This is done in order to permit the cavity U' to receive its charge of air first, tending to force the diaphragm downward, thereby assuring the pin V' being in its proper position when air is admitted to the cavity U. It will be readily seen that when there is a non-leaky can in position the diaphragm will not move.

As already stated, Fig. 1 represents a front elevation of the machine. In this view will be seen means for feeding cans from any suitable runway $d$ to the adjustable can-pockets $e$, of which Fig. 5 is a detail. The pockets consist of flat arms secured to the studs H by a set-screw $e'$. The pockets $e$ are constructed and arranged to hold the cans directly central with the rubber ring or disk X in the pressure-chamber J. It will be noticed in Fig. 1 by the dotted lines of the pockets $e$ that their construction and arrangement provide a continuous circular band, with pockets for each pressure-chamber. Assuming that the can has entered the pocket $e$ from the runway $d$ and the disk E is revolving in the direction of the arrow, the next operation would be to clamp the can against the rubber disk X in the pressure-chamber J, which operation is as follows:

In Fig. 2 will be seen the disk E partly sectioned in order to show the clamping mechanism. In the disk E is a slot $f$. In said slot $f$ is a loosely-fitting pin or bolt $g$ with a collar $g'$, carrying on its end the cam-roll $h$, which runs freely in the cam-track N'. On the opposite end of the pin $g$ and on the inner side of the disk E is a slide $j$, which is secured to the pin $g$ by the nut $j'$. In the slide $j$ is a slot $j^2$, (shown by dotted lines,) through which a bolt $j^3$ passes and is screwed into the disk E. The object of the bolt $j^3$ is to provide steadying means for the slide $j$. Pivoted to the slide $j$ is a connecting-link L, which on one end is pivoted to the link L' and link L². On the end of the link L' there is connected a stem $m$, which passes and is steadied through a hole in the disk E. On the end of the stem $m$ is a small circular disk $m'$, the object of which is to provide a flat surface for bearing against the can-bottom. One end of the link L² is pivoted to the projections K' of the bar or brace K. It will readily be seen that as the disk E rotates in the direction of the arrow the cam-roll $h$ revolves in the cam-track N' of the circular cam N, causing the slide $j$ to move in and out as the roll meets the uneven part of the track N'. The cam-track N' is so arranged that at the time the pressure-chamber J is opposite the can-runway $d$ the slide $j$ will have been moved toward the center of the machine, which causes the links L, L', and L² to change their positions, thereby moving the small disk $m$ against the disk E. This operation allows the can to roll freely into the can-pocket $e$. When the can has entered the pocket, the further movement of the disk E sets in operation the slide $j$, with the links L, L', and L², forcing the small disk $m$ against the can-bottom, thereby clamping the same. Next the ball $a'$ of the valve-plug lever $a$ contacts with the cam-track $b$. This track opens and again shuts the air-ports previously described.

It will be noticed that after air has been introduced into the pressure-chambers J and the cans they travel some distance before the cam-track N' again moves the slide $j$ to release the can. This is done in order to afford enough time for the smallest leak in the can to exhaust enough air that the diaphragm Z may move.

About centrally located with the machine and in a position to receive the released or discharged cans is a hinged plate $n$, the surface of which corresponds with the bottom of the runway $p$. Said plate $n$ has projections $n'$, which are hinged to projections $n^2$ on the casting $n^3$ by the pin $n^4$. Said casting $n^3$ is held in position by a column with a suitable base. On the casting $n^3$ is an arm $q$, from which arise projections $q'$, the object of which is to support a lever $r$, which has pivoted at one end the connecting-rod $r'$, which rod connects to the hinged plate $n$ by the rod $r^3$ at $r^2$. On the other end of the lever $r$ a spring $r^4$ is attached and secured to the casting $n^3$ by the pin $r^5$. The object of the spring is to offer resistance to the weight of a can, thereby holding the plate $n$ in the position shown, allowing the can to roll onto the runway $p$. By the operation before described a leaky can would cause the diaphragm to raise and allow the air in the cavity U to force the pin V' out. Said pin V' would come in contact with the lever $r$ and force it downward, thereby swinging the plate $n$ through the connecting-rod $r'$ downward on its pivot and allow the leaky can to be discharged through the opening thus made instead of entering the runway $p$.

After a non-leaky can is released and discharged the pressure in the cavity U will raise the diaphragm Z and force the pin V' out; but the said pin has then passed the lever $r$, and consequently would not operate the hinged plate $n$. After the air is exhausted from the cavity U by leaking out past the loosely-fitting pin V' the said pin is forced into its original position by an arm or projection $t$, secured to the runway-guides $p'$.

Having thus described my invention, what I claim, and desire to secure by Letters Patent, is—

1. A can-testing machine comprising a rotatable carrier means, chambers having an intermediate flexible diaphragm, one of said chambers being open at one side, means for holding a can against the open side of said chamber, with fluid-tight joint, means for supplying air at equal pressure to both chambers, means for shutting off the air-pressure after the chambers have been filled, means for releasing the can, and means actuated by a variation of pressure within the chambers whereby the leaky and non-leaky cans are automatically separated.

2. A can-testing machine comprising a rotatable carrier means, chambers having an intermediate flexible diaphragm, one of said chambers being open at one side, means for removably holding a can against the open side of the said chamber with a fluid-tight joint, means for supplying a gaseous fluid at equal pressure to both chambers, means for shutting off the fluid after the chambers have been filled, and means actuated by a variation of pressure within the chambers whereby the leaky and non-leaky cans are automatically separated.

3. In a machine of the character described the combination of rotatable carrier means, compressing-chambers and an intermediate flexible diaphragm, one of said chambers being open at one side, can-holding means for removably holding the open end of a can closely against the open side of the said chamber, means for admitting a gaseous fluid to the chambers and means for cutting off the fluid to the chambers when the latter are filled, and can-separating means and connections between the same and the diaphragm and actuated by a variation of fluid-pressure in the chambers whereby the leaky cans are automatically separated from the non-leaky cans.

4. A can-testing machine comprising rotatable carrier means, contiguous chambers of equal transverse area with an intermediate flexible diaphragm, one of said chambers having an open side, means for holding the open mouths of cans closely against the open side of the said chamber, means for admitting air under pressure equally to both chambers, means for shutting off the air-supply when the chambers are filled, can-separating mechanism, and means actuated by a variation of air-pressure in the chambers for operating the separating devices whereby the leaky cans are separated from non-leaky cans.

5. A can-testing machine consisting of a rotatable carrier, contiguous chambers with intermediate flexible diaphragm, one of said chambers being open at one side and having means for making a fluid-tight connection with the open mouth of the can, a valve located in the other chamber connected with the diaphragm and closed when the diaphragm is in its normal position, can-holding mechanism, means for admitting air under equal pressure simultaneously to both chambers, means for shutting off the air-supply when both chambers are filled, can-separating means, and means controlled by the escape of air when the valve is opened for actuating the separating means whereby leaky cans are separated from the non-leaky ones.

6. A can-testing machine comprising a rotatable carrier, chambers having substantially equal area of cross-section, one of said chambers being open at one side, a flexible diaphragm fixed between the chambers, means for admitting air at equal pressure to both chambers, means for shutting off the air-supply when both chambers are filled, means for holding the mouth of a can closely against the open-sided chamber, means for releasing the can-holding means, a plunger movable in one of the chambers, can-separating mechanism, a valve between the said cylinder and the closed chamber, and a stem connecting the valve with the diaphragm whereby a variation of pressure in one of the chambers causes the diaphragm to unseat the valve and allow the escaping air at the other side of the diaphragm to move the plunger into the range of action of the separating devices, to operate the latter to separate the leaky from the non-leaky cans.

7. In an apparatus for testing cans, the combination of a rotatable carrier, chambers having substantially equal areas in transverse section, one of said chambers being open at one side, a flexible diaphragm positioned between the chambers, means for admitting air at substantially equal pressure to both cylinders said air-admission means including a valve and ports controlled thereby, means for shutting off the air-supply when both chambers are filled, means for holding the mouth of a can closely against the open-sided chamber, a plunger movable in the casing of the closed chamber, can-separating mechanism for separating leaky from non-leaky cans, and a valve and connection between the same and one side of the diaphragm and actuated by a reduction of pressure on the opposite side of the diaphragm, to allow the air-pressure in the closed chamber to project the plunger into the range of action of the can-separating mechanism.

8. A can-testing machine consisting of a series of chambers revoluble about a common center, said chambers each comprising two compartments with a flexible separating diaphragm, one of said compartments being open at one side, means whereby cans are placed in open communication with one of said chambers and a fluid-tight joint formed therewith, a plunger movable in a cylinder communicating with the other chamber, means for admitting air under equal pressure to each pair of chambers, means for shutting off the air-supply when both chambers are filled, independent runways through which leaky and non-leaky cans may be discharged, a valve whereby variation of pressure in the chambers discharges air and actuates the plunger and mechanism controlled by said plunger whereby the cans are delivered to their respective runways.

9. A can-testing machine consisting of a series of air-chambers, mechanism by which they are revolved about a common center, flexible diaphragms by which each chamber is separated into two parts, one of said chambers having an open side, a central supply-chamber, radial pipes connecting said chamber with the peripheral revoluble chambers, valves by which air is equally admitted upon opposite sides of the diaphragm of each chamber, means for shutting off the air-supply when both chambers are filled, chutes through which cans are placed in open communication with the chamber upon one side of the diaphragm, and means for making a tight joint therewith, a plunger movable in a cylinder connecting with the other portion of each chamber, a valve connected and movable in unison with the diaphragm whereby air is admitted to move the plunger, mechanism actuated by said plunger when protruded whereby the leaky cans are separately discharged from the non-leaky ones.

10. A can-testing machine consisting of a series of chambers, with one chamber of each series having an open side, mechanism whereby said chambers are revoluble about a common center, flexible diaphragms separating each chamber into two parts, a central source of supply, pipes leading therefrom to the chambers and valves whereby air under pressure is admitted to each part of the chambers, means for shutting off the air-supply when each part of the chambers is filled, can-delivering chutes and holders by which the cans are placed with their open mouths in fluid-tight communication with one part of the chamber, plungers controlled by the movement of the flexible diaphragms of the chambers, separate discharge-chutes for the leaky and non-leaky cans, and mechanism controlled by the movement of the plunger whereby said cans are delivered to their respective chutes.

11. A can-testing machine consisting of a series of peripheral chambers revoluble about a common center, flexible diaphragms by which each chamber is divided into two parts, one of said parts being open at one side, a supply-chute, means for retaining cans delivered thereby with their open ends in fluid-tight contact with one part of the chamber, a plunger moving in a valve-controlled cylinder, connecting with the other chamber, means for supplying air simultaneously and under equal pressure to the chambers upon each side of the diaphragm, means for shutting off the air-supply when both parts of the chamber are filled, superposed runways, the upper one adapted to receive non-leaky cans, a tiltable gate fixed in the bottom of said runway and above the other runway, a cam-lever connected with said bottom and normally retaining it in line with the runway, said lever being engaged by the plunger when the latter is forced out whereby the hinged bottom is depressed and leaky cans are discharged therethrough into the lower runway.

12. In a can-testing machine, superposed runways, a hinged tiltable bottom located in the floor of the upper runway, a cam-lever connected with the movable bottom and by which said bottom is normally kept closed, a rotatable carrier, chambers with an intermediate diaphragm, means for supplying the chambers with air under pressure, one of said chambers being open at one side, means for supporting cans on the carrier in fluid-tight contact with the open-sided chamber, a cylinder and plunger connected with the other chamber, means for shutting off the air when both chambers are filled, and means controlled by the diaphragm whereby the plunger is moved by a loss of pressure in the can-connected chamber, and projected to engage the cam-lever and depress the hinged bottom to allow the leaky can to pass into the lower runway.

13. In a can-testing machine, the combination of a rotatable carrier, chambers with an intermediate flexible diaphragm, one of said chambers being open at one side, means for placing cans in fluid-tight communication with the open-sided chamber, a plunger movable in a cylinder connected with the other chamber, means for simultaneously admitting air under equal pressure to both chambers, and then cutting off the supply, superposed discharge-runways, a hinged depressible floor-section in the upper runway, a spring-pressed cam connected to normally retain said floor-section closed, and means controlled by the diaphragm whereby said cam is engaged by the plunger, and the movable floor-section depressed by a reduction of pressure in the can-connected cavity.

14. In a can-testing machine, chambers or cavities with intermediate flexible diaphragms, means for admitting air under equal pressure to both cavities, means for holding cans in fluid-tight communication with one of the cavities, said means comprising a reciprocable disk, connecting-links and slides and a cam by which said slides are moved.

15. In a can-testing machine, chambers or cavities with intermediate flexible diaphragms, means for admitting air under equal pressure to both cavities, means for holding cans in fluid-tight communication with one of the cavities, and subsequently releasing the cans, said means comprising a holder, a reciprocable disk, connecting-links, slides and an actuating-cam, and means for delivering the leaky and non-leaky cans into separate discharge-runways.

16. A machine for testing cans having in combination, a pair of chambers and a pressure-regulator therein, one of said chambers being open to communicate with the mouth of a can, means for holding a can in contact with the open-ended chamber, means for supplying a gaseous fluid to both chambers, means for shutting off the fluid-supply when the chambers are both filled, can-separating mechanism, and mechanism within the control of the pressure-regulator for actuating the separating mechanism.

In testimony whereof I have hereunto set my hand in presence of two subscribing witnesses.

PETER KRUSE.

Witnesses:
  S. H. NOURSE,
  JESSIE C. BRODIE.